United States Patent [19]

Shinjo

[11] Patent Number: 5,042,888
[45] Date of Patent: Aug. 27, 1991

[54] ANCHOR BOLT HAVING A SPRING

[75] Inventor: Katsumi Shinjo, Osaka, Japan

[73] Assignee: Yugen Kaisha Shinjoseisakusho, Osaka, Japan

[21] Appl. No.: 553,736

[22] Filed: Jul. 18, 1990

[30] Foreign Application Priority Data

Jun. 6, 1990 [JP] Japan .................. 2-149481

[51] Int. Cl.[5] ............................. F16B 13/06
[52] U.S. Cl. ......................... 411/54; 411/44; 411/55
[58] Field of Search .............. 411/15, 16, 44, 54, 411/55, 57

[56] References Cited

U.S. PATENT DOCUMENTS

| 3,922,831 | 12/1975 | Fischer | 411/55 X |
| 3,958,488 | 5/1976 | Fischer | 411/44 |
| 4,028,988 | 6/1977 | Schafers | 411/44 |
| 4,519,735 | 5/1985 | Mächtle | 411/44 X |
| 4,613,264 | 9/1986 | McIntyre et al. | 411/55 |

FOREIGN PATENT DOCUMENTS

| 2632487 | 1/1978 | Fed. Rep. of Germany | 411/55 |
| 3544916 | 6/1987 | Fed. Rep. of Germany | 411/55 |
| 512954 | 1/1921 | France | 411/55 |
| 285310 | 4/1987 | Japan . | |
| 283674 | 10/1952 | Switzerland | 411/55 |
| 722340 | 1/1955 | United Kingdom | 411/55 |
| 886857 | 1/1962 | United Kingdom | 411/55 |

Primary Examiner—Rodney M. Lindsey
Assistant Examiner—Jerry Redman
Attorney, Agent, or Firm—Antonelli, Terry, Stout & Kraus

[57] ABSTRACT

An anchor bolt having a spring member is provided, with the anchor bolt comprising a fastening sleeve, an expansion sleeve and an expansion body. The spring member is interposed between the fastening sleeve and the expansion sleeve, and the expansion body is disposed at one end portion of a threaded rod formed as an anchor main body and is adapted to be inserted deep in a hole of a concrete structure together with the threaded rod. The said fastening sleeve and spring member are loosely fitted on the threaded rod, wherein the fastening sleeve adapted to be fixed within an inlet portion of the hole compresses the spring member to urge the expansion sleeve toward the expansion body so as to be expanded thereby, thus preventing the anchor bolt from being removed from or being loosened in the hole. The fastening sleeve preferably comprises an opening through which an end portion of the spring member extends to be exposed for visual inspection. The expansion body may either be formed integral with the screw rod, or be formed as a nut mating therewith.

3 Claims, 3 Drawing Sheets

ANCHOR BOLT HAVING A SPRING

BACKGROUND OF THE INVENTION

1. Field of the Invention

The invention relates to an anchor bolt having a spring, with spring being used to fix various mechanical parts, pipings or the like on a concrete structure such as wall, ceiling, floor or the like.

2. Description of Prior Art

An anchor bolt of the type mentioned above most widely a threaded rod, an expansion body formed at one end of the threaded rod as an anchor body, and an expansion sleeve fitted on the threaded rod penetrating therethrough wherein the expansion sleeve is expanded by the expansion body so as to hold the anchor bolt in a hole of, for example, concrete structure above.

Although the known anchor bolt is advantageous due to its simple structure and is easy to handle in construction work a violent vibration or an earthquake is likely to cause some problems to the anchor bolt. More particularly, the vibration or earthquake causes some cracks on the wall defining the hole, thereby removing the anchor bolt from the hole or gradually moving the bolt outwardly. There are also known some other anchor bolts, for example, disclosed in Japanese Tokkai Publication No. 63-285310 or in U.S. Pat. No. 4,613,264, which comprise a spring member employed to solve the problem mentioned above, with the spring member being interposed between the expansion body and a stopper formed on the threaded rod of anchor body so that a force outwardly pulling the threaded rod acts on the expansion body by the spring member and expands the expansion sleeve.

It is to be noted that in the known anchor bolts comprising the spring member any satisfactory force in axial direction effective to expand the expansion sleeve is not obtained unless the pulling force acting on the threaded rod does completely compresses the spring member, or until the expansion body bears against the stopper. Consequently, an extractable length of the threaded rod is to be increased to ensure the satisfactory force in axial direction. This requirement inevitably increases the length of the threaded rod at its unextracted state, thus making cumbersome the tightening of a nut which mates with the screw rod. Further, the known anchor bolt comprising the spring member are composed of more parts than the first-mentioned known anchor bolt is, causing a higher manufacturing cost. A still further disadvantage in construction work is that the hole must be drilled deeper into the concrete structure.

SUMMARY OF THE INVENTION

The present invention was made to solve the above-mentioned problems in the known anchor bolts. Therefore, an object of the invention is to provide an anchor bolt comprising a threaded rod which is substantially of the same size and shape as that included in the conventional anchor bolts, wherein the expansion of the sleeve is nevertheless surely effected securing the threaded rod in the hole of concrete structure, without a fear of removal or loosening of the rod even in a case where the cracks are likely to be produced around the hole due to the violent vibrations or an earthquake. In order to achieve the object, an anchor bolt having a spring member according to the invention comprises a fastening sleeve, with an expansion sleeve and an expansion body, the expansion body being disposed at one end portion of a threaded rod as an anchor main body. The expansion sleeve is fitted on the threaded rod, with the fastening sleeve and the spring member being loosely fitted on the threaded rod wherein the fastening sleeve fixed within an inlet portion of a hole drilled in a concrete body compresses the spring member so as to urge the expansion sleeve to be expanded by the expansion body which is inserted deep in the hole of the concrete structure together with the threaded rod. It is preferable to provide the fastening sleeve with an opening through which an end portion of the spring member extends to be exposed for visual check thereof.

The expansion body disposed at the end portion of the threaded rod may either be formed integral with the threaded rod, or be formed as a nut mating therewith.

In operation, the threaded rod is inserted into the hole with its expansion body leading the other parts. The fastening sleeve is then forced into the inlet portion of the hole so as to be fixed therein. As a result, the spring member which is thus compressed by the fastening sleeve will expand the expansion sleeve, thereby securing the threaded rod in the hole. The spring member always strongly urges the expansion sleeve toward the expansion body so that this sleeve is displaced from its original position to a new position nearer the expansion body if the vibration or cracks would unexpectedly and undesirably cause disengagement of the surface of the expansion sleeve from the inner wall surface of the hole. Such a displacement of the expansion sleeve results in additional expansion thereof which restore the rigid and enforced engagement of the sleeve with the wall surface.

On the other hand, the end portion of the spring member is exposed to the outside through the opening of the fastening sleeve which is compelled to fit the inlet portion of the hole.

It will now be apparent that the anchor bolt of the invention is advantageous in that the expansion sleeve can be sufficiently expanded by the spring member merely by the striking of the fastening sleeve into the hole in the concrete structure. The threaded rod functioning as the anchor main body is thus firmly fixed in the hole in such a stable state that any possible cracks on the inner wall which would take place around the hole due to the strong vibrations or an earthquake cannot cause the removal or loosening of the threaded rod.

The anchor bolt in the invention can be manufactured at a lower cost because it is simple in its structure comprising a smaller number of parts, particularly because the length and shape of the threaded rod itself are not substantially different from those of the known usual anchor bolt.

Visual inspection of the spring member favorably makes it possible to check for the presence thereof during construction work because the end of the spring member is exposed to the outside through the opening of the fastening sleeve.

BRIEF DESCRIPTION OF THE DRAWINGS

The invention will become more apparent from the description made hereinafter referring to the drawings, in which.

DETAILED DESCRIPTION OF PREFERRED EMBODIMENTS

Figure 1:
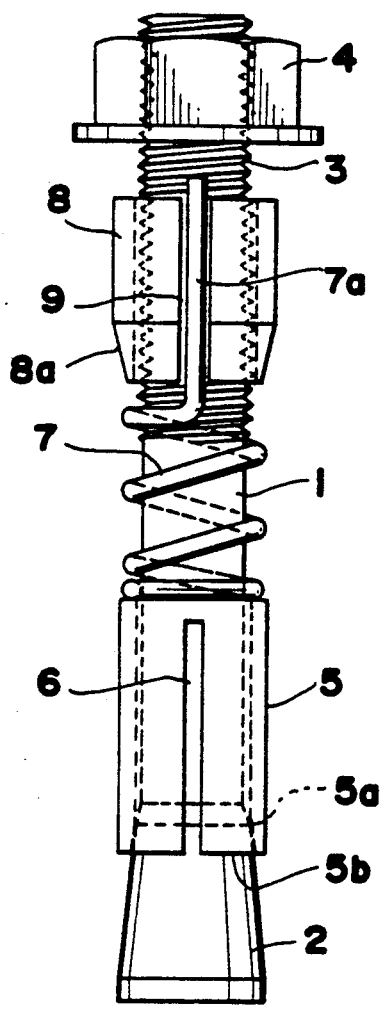
FIG. 1 is a front elevation of an anchor bolt having a spring member in an embodiment of the invention.
Figure 2:
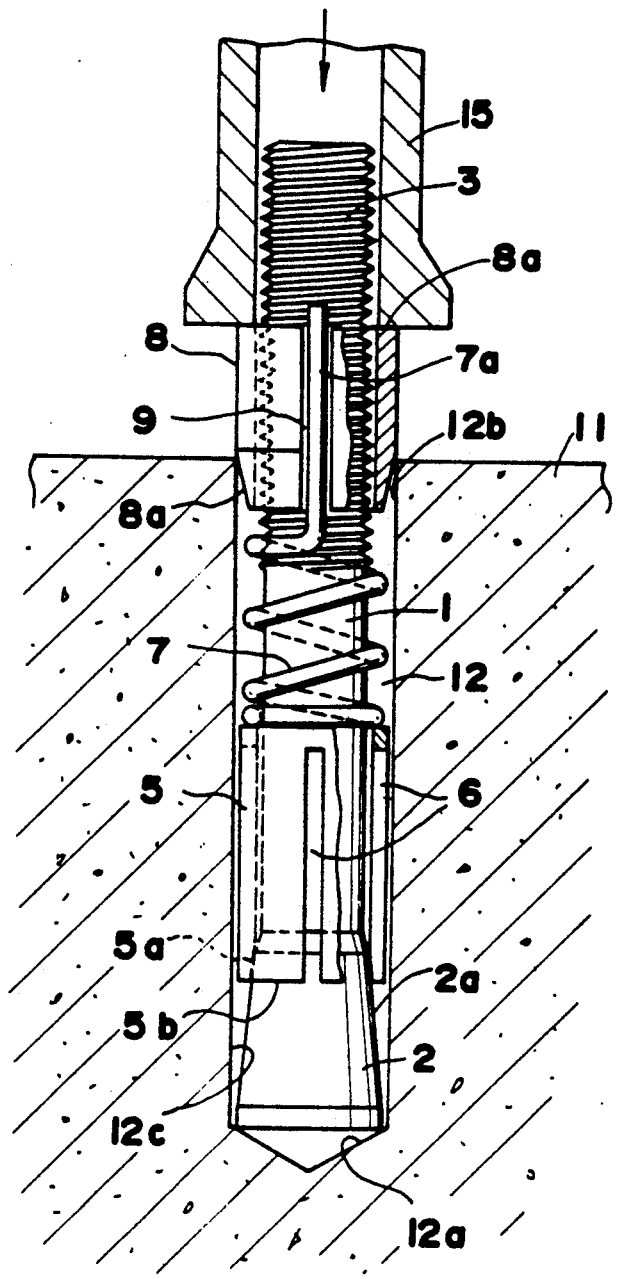
FIG. 2 and 3 are front elevations showing partially in cross section the anchor bolt which is being installed or used.

As is shown in FIG. 1, an anchor bolt having a spring member comprises a threaded rod 1 as an anchor main body. The threaded rod comprises an expansion body 2 formed integral with one end portion of the threaded rod, with the expansion body 2 being of a frustum shape and having a tapered surface 2a gradually increasing outwardly the diameter of the expansion body. The threaded rod 1 further comprises at its other end portion a male threaded 3 adapted to be threaded to a fastening nut 4. As for the shape of the threaded rod, it is similar to those which are included in the known anchor bolts of this type.

An expansion sleeve 5, fitted loosely on the threaded rod 1, is manufactured either by cutting into a predetermined length of a thin walled metal pipe, or formed by the powder metallurgy into a cylindrical shape of thin wall. Formed at an inner surface of an expansible part near one extremity 5b of the expansion sleeve 5 is a tapered surface 5a which extends along the tapered surface 2a of the expansion body 2. A plurality of slits 6 are formed to extend in axial direction from the extremity 5b of the expansion sleeve 5 whereby it can readily be expanded solely by a resilient force exerted by a spring member 7 which will be described below.

The spring member 7 urges the expansion sleeve 5 toward the expansion body, and the spring member is preferably a coiled spring made by coiling a spring steel wire into a helical shape of substantially the same outer diameter as the expansion sleeve 5. The spring member 7 is loosely mounted in its uncompressed state on the screw rod 1, with its leading end bearing against the other extremity of the expansion sleeve 5. A cylindrical a fastening sleeve 8, made of a metal, has an outer diameter slightly greater than that of the expansion sleeve 5. The fastening sleeve 8 has an inner diameter also slightly greater than the outer diameter of the male threaded 3. A tapered portion 8a is formed near a tip end of the fastening sleeve 8 in such a manner as gradually decreasing the outer diameter toward said tip end. A portion extending in axial direction of the fastening sleeve 8 is cut off to form an opening 9 which extends between the tip end and a trailing end of the fastening sleeve 8. The fastening sleeve 8 is loosely fitted on the threaded rod 1, following the spring member ( i.e., coiled spring ) 7 which is previously set around the rod 1. A trailing straight end portion 7a extending from and in axial direction of the spring member ( i.e., coiled spring ) 7 is exposed to the outside through the opening 9 after the fastening sleeve 8 is mounted on said rod 1.

In use, the nut 4 is removed from the threaded rod 1 before insertion in a hole 12 drilled in a concrete structure 11, with its expansion body 2 leading the other parts of the anchor bolt. After a leading thick end of the expansion body 2 has reached a bottom 12a of the hole so as to be supported thereon, a cylindrical pressing tool 15 is fitted on the end of the threaded rod 1 such that the tool 15 comes into pressing contact with the trailing end 8b of the fastening sleeve 8.

Subsequently, the pressing tool 15 is struck to forcibly insert the fastening sleeve 8 into the hole 12 and to secure it in an inlet portion 12b thereof whereby the fastening sleeve 8 compresses the spring member (i.e., coiled spring) 7. The compressed spring member 7 urges the expansion sleeve 5 toward the expansion body 2 so that the sleeve 5 is expanded diametrically due to the tapered surface 2a of the expansion body 2 to such a degree that the expansion sleeve 5 engages with a wall surface 12c around the hole 12, thus fixing the threaded rod 1 within the hole 12. In this state, the trailing straight portion 7a of the spring member 7 extends through the opening 9 of the fastening sleeve 8 and is exposed to the outside, allowing visual inspection of the presence or absence of said spring member 7. Finally, the nut 4 is threaded on the male thread 3 of the threaded rod 1 fastened to the concrete structure 11 in order to secure thereon an object 13 to be mounted. It is to be noted that the thus threaded nut 4 exerts a force pulling the threaded rod 1 thereto to further ensure the expansion of the expansion sleeve 5. As already described hereinbefore, the spring member 7 always urges the expansion sleeve 5 of the anchor bolt which is securedly set in the hole 12 toward the expansion body 2. Therefore, the expansion sleeve 5 automatically moves toward the expansion body 2 in the event of the violent vibrations or an earthquake which might cause the cracks on the wall 12c around the hole 12 and, consequently any disengagement of the expansion sleeve 5 from the wall 12c. Such a spontaneous displacement further expands the expansion sleeve 5 to reengage with the wall 12c, thereby keeping the threaded rod 1 retained firmly within the hole.

Figure 3:
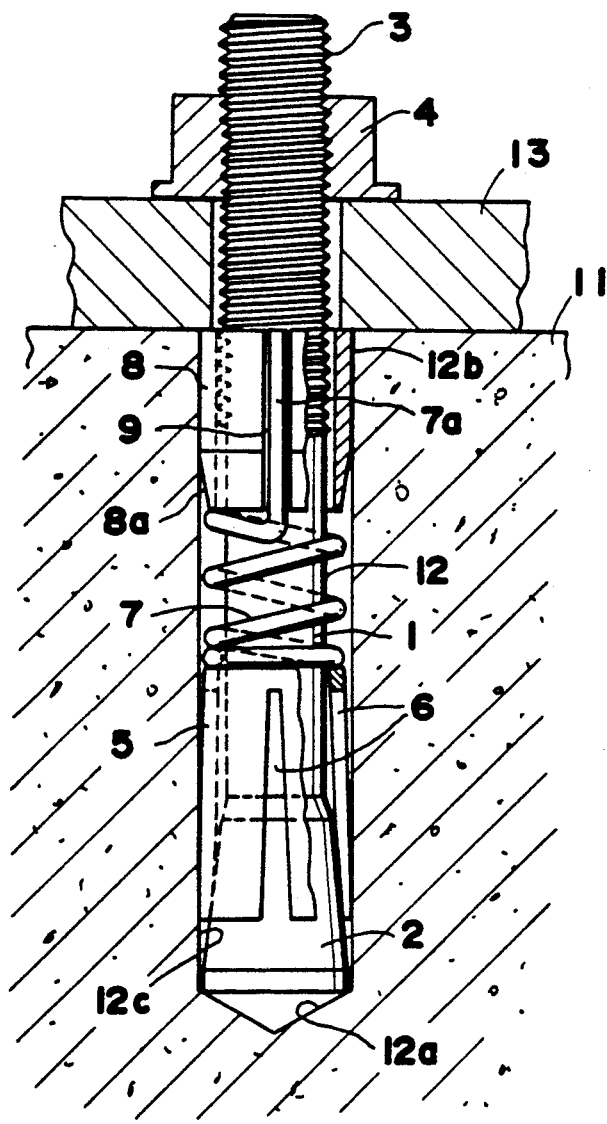
Figure 4:
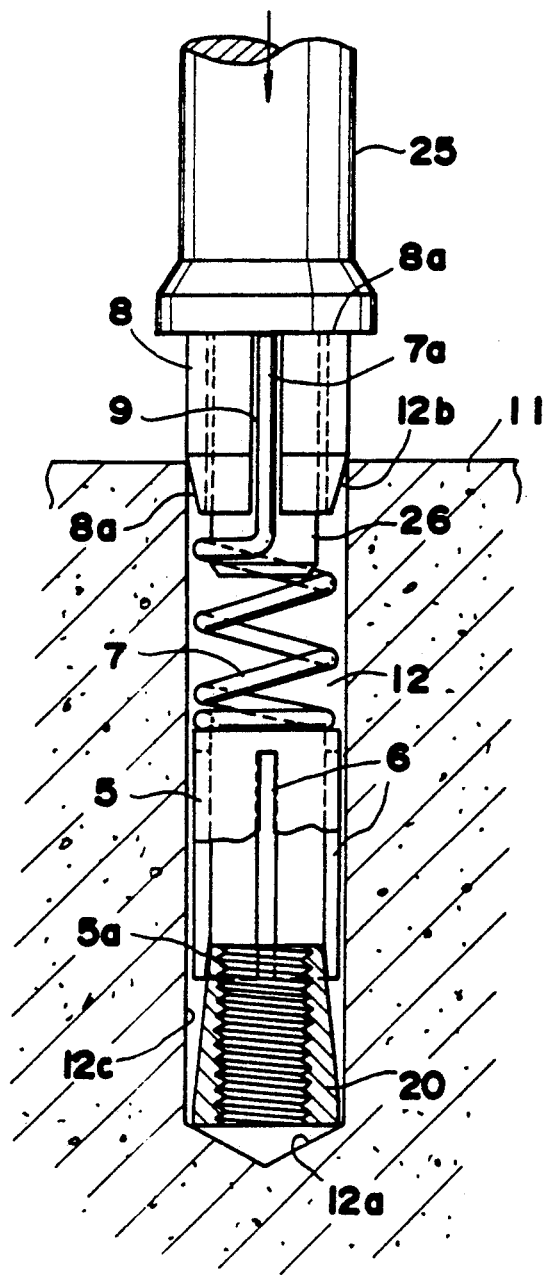
FIG. 4 is a front elevation of a further anchor bolt having a spring member in another embodiment of the invention.

In the embodiment of FIGS. 3 and 4, the expansion body 2 is formed as a nut 20 through which is threaded is a male thread 23 of a bolt 21 having a head 22.

In this case, the bolt 21 is first removed as shown in FIG. 4, and then the nut 20, the expansion sleeve 5, the spring member 7 and the fastening sleeve 8 are inserted in the hole 12 in this order. The pressing tool 25, comprising a guiding protrusion 26, is used to strike the fastening sleeve 8 into the inlet portion 12b of said hole 12. The fastening sleeve 8 compresses the spring member 7 to forcibly expand the expansion sleeve 5.

Figure 5:
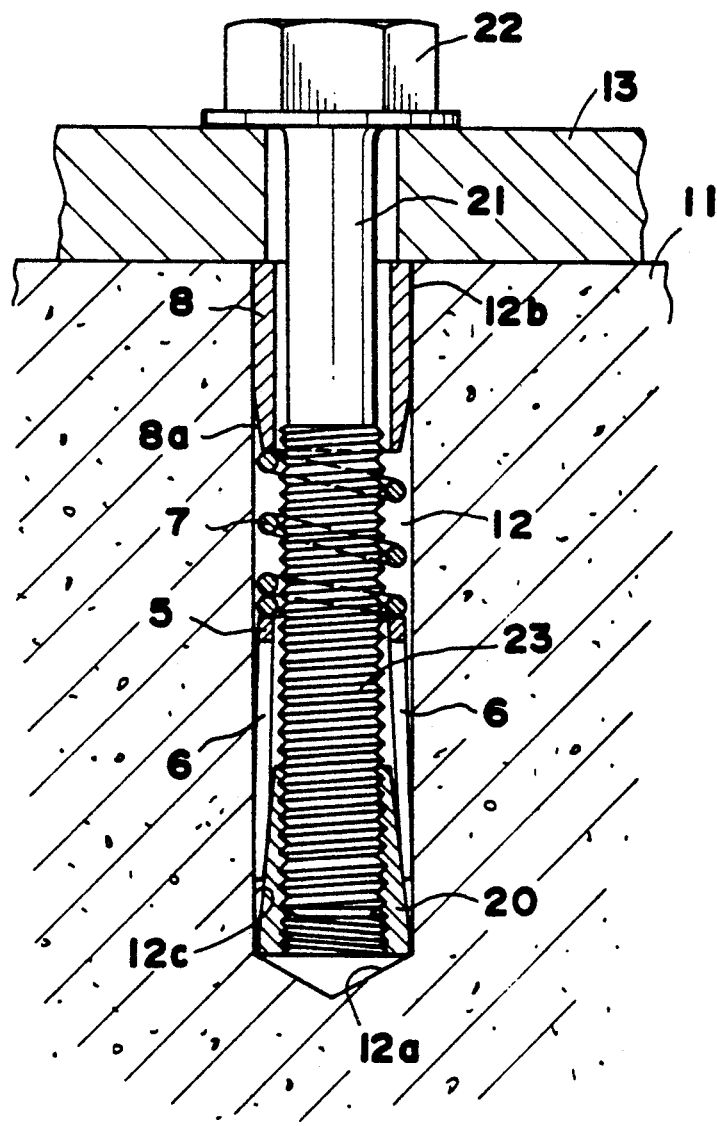
FIG. 5 is a front elevation showing partially in cross section the further anchor bolt which is being used.

Because the expansion body 2 is shaped as a nut 20 in the further embodiment, it is possible to employ the bolt 21 shown in FIG. 5 in place of the threaded rod 1 in order to fasten the object 13 to the concrete structure 11.

What is claimed is:

1. An anchor bolt comprising a fastening sleeve, an expansion sleeve, an expansion body, a spring member interposed between the fastening sleeve and the expansion sleeve, said expansion sleeve being disposed at one end portion of a threaded rod as an anchor main body, said expansion sleeve being fitted on the threaded rod, and the fastening sleeve and the spring member being loosely fitted on the threaded rod, the fastening sleeve is adapted to be fixed within an inlet portion of a hole drilled in a concrete structure, said fastening sleeve being adapted to compress the spring member to urge the expansion sleeve toward the expansion body so as to be expanded by said expansion body inserted deep in the hole together with the threaded rod, and wherein the fastening sleeve is provided with an opening through which an end portion of the spring member extends so as to be exposed to the outside.

2. An anchor bolt according to claim 1, wherein the expansion body is formed integrally with the threaded rod.

3. An anchor bolt according to claim 1, wherein the expansion body is formed as a nut through which an end portion of the threaded rod is threaded.

* * * * *